United States Patent
Borchert et al.

(10) Patent No.: US 10,165,249 B2
(45) Date of Patent: *Dec. 25, 2018

(54) METHOD FOR SMOOTHING TRANSITIONS BETWEEN SCENES OF A STEREO FILM AND CONTROLLING OR REGULATING A PLURALITY OF 3D CAMERAS

(71) Applicant: Truality, LLC, Las Vegas, NV (US)

(72) Inventors: Martin Borchert, Kissing (DE); Howard Postley, Santa Monica, CA (US)

(73) Assignee: Truality, LLC, Las Vegas, NV (US)

(*) Notice: Subject to any disclaimer, the term of this patent is extended or adjusted under 35 U.S.C. 154(b) by 0 days.

This patent is subject to a terminal disclaimer.

(21) Appl. No.: 15/422,277

(22) Filed: Feb. 1, 2017

(65) Prior Publication Data

US 2017/0310943 A1 Oct. 26, 2017

Related U.S. Application Data

(63) Continuation of application No. 14/493,276, filed on Sep. 22, 2014, now Pat. No. 9,602,801, which is a
(Continued)

(30) Foreign Application Priority Data

Jul. 18, 2011 (DE) ........................ 10 2011 107 765

(51) Int. Cl.
*H04N 13/00* (2018.01)
*H04N 13/128* (2018.01)
(Continued)

(52) U.S. Cl.
CPC ......... *H04N 13/128* (2018.05); *H04N 13/239* (2018.05); *H04N 13/243* (2018.05); *H04N 13/296* (2018.05)

(58) Field of Classification Search
CPC ........... H04N 13/0022; H04N 13/0242; H04N 13/0239; H04N 13/0296
(Continued)

(56) References Cited

U.S. PATENT DOCUMENTS 2,370,611 A 2/1945 Du
2,603,134 A 7/1952 Burnam
(Continued)

FOREIGN PATENT DOCUMENTS

GB 2425185 A 10/2006
JP 05-130646 5/1993
(Continued)

OTHER PUBLICATIONS

English Translation of Japanese Office Action in JP Application No. 2014-523219 dated Feb. 29, 2016 in 8 pages.
(Continued)

*Primary Examiner* — Allen C Wong
(74) *Attorney, Agent, or Firm* — Knobbe, Martens, Olson & Bear, LLP

(57) ABSTRACT

In an exemplary embodiment, a method for producing a stereo film is provided, wherein a first image that is supplied (10) by a first camera rig having at least two cameras is followed (50) by a second image from a second camera rig, wherein furthermore a disparity table for definition of the displacement of a defined image point in a first sub-frame supplied by a first camera of the first camera rig relative to an image point similar thereto in a second sub-frame supplied by a second camera of the first camera rig is determined (20, 30) in order to obtain information about the depth of the first image composed of the first sub-frame and the second sub-frame, wherein the depth information of the disparity table of the first image of the first camera rig is used (60) for processing of the second image of the second
(Continued)

camera rig. The invention also relates to controlling (means) or regulating means for a plurality of 3D cameras configured to carry out said method.

24 Claims, 2 Drawing Sheets

Related U.S. Application Data continuation of application No. 14/233,729, filed as application No. PCT/EP2012/002038 on May 11, 2012, now abandoned.

(51) Int. Cl.
*H04N 13/243* (2018.01)
*H04N 13/296* (2018.01)
*H04N 13/239* (2018.01)

(58) Field of Classification Search
USPC .......................................................... 348/47
See application file for complete search history.

(56) References Cited

U.S. PATENT DOCUMENTS

| | | | |
|---|---|---|---|
| 2,712,779 | A | 7/1955 | Tolcher |
| 2,746,369 | A | 5/1956 | Beard |
| 2,753,778 | A | 7/1956 | Tolcher |
| 2,945,428 | A | 7/1960 | Dearborn |
| 3,006,052 | A | 10/1961 | Stickney |
| 3,126,187 | A | 3/1964 | Mooney |
| 3,371,589 | A | 3/1968 | Hill |
| 3,737,130 | A | 6/1973 | Shiraishi |
| 3,767,095 | A | 10/1973 | Jones |
| 4,943,820 | A | 7/1990 | Larock |
| 4,963,904 | A | 10/1990 | Lee |
| 5,359,381 | A | 10/1994 | Miyazawa et al. |
| 6,056,449 | A | 5/2000 | Hart |
| 6,068,223 | A | 5/2000 | Navarro |
| 6,457,880 | B1 | 10/2002 | Slot et al. |
| 7,191,923 | B1 | 3/2007 | Kundig |
| 8,128,295 | B2 | 3/2012 | Pizzo et al. |
| 8,783,973 | B2 | 7/2014 | Pizzo et al. |
| 2002/0154228 | A1 | 10/2002 | Matsumura |
| 2005/0053307 | A1 | 3/2005 | Nose et al. |
| 2005/0168616 | A1 | 8/2005 | Rastegar et al. |
| 2005/0237385 | A1 | 10/2005 | Kosaka et al. |
| 2007/0075997 | A1* | 4/2007 | Rohaly ................. G06T 7/80 345/419 |
| 2007/0139612 | A1 | 6/2007 | Butler-Smith et al. |
| 2007/0146478 | A1 | 6/2007 | Butler-Smith et al. |
| 2008/0002910 | A1 | 1/2008 | Ojima et al. |
| 2009/0128621 | A1 | 5/2009 | Passmore et al. |
| 2010/0118150 | A1 | 5/2010 | Boland et al. |
| 2011/0001847 | A1 | 1/2011 | Iwasaki |
| 2011/0057948 | A1 | 3/2011 | Witt et al. |
| 2011/0117960 | A1 | 5/2011 | Miura |
| 2011/0169918 | A1 | 7/2011 | Yoo |
| 2011/0210965 | A1* | 9/2011 | Thorpe ................... G06T 7/593 345/419 |
| 2012/0249730 | A1* | 10/2012 | Lee ......................... G06T 17/00 348/38 |
| 2015/0077521 | A1 | 3/2015 | Borchert et al. |

FOREIGN PATENT DOCUMENTS

| | | |
|---|---|---|
| JP | H6-105340 | 4/1994 |
| JP | 1996-251626 | 9/1996 |
| JP | H8-251626 | 9/1996 |
| JP | 2001/283246 | 10/2001 |
| JP | 2004/354257 | 12/2004 |
| JP | 2006-157432 | 6/2006 |
| JP | 2008/033897 | 2/2008 |
| JP | 2008/241491 | 10/2008 |
| JP | 2010-226391 | 10/2010 |
| JP | 2011/013425 | 1/2011 |
| JP | 2011-035642 | 2/2011 |
| JP | 2011-55022 | 3/2011 |
| JP | 2011/061788 | 3/2011 |
| JP | 2011-520398 | 7/2011 |
| WO | WO 2009/0139740 | 11/2009 |
| WO | WO 2012/0037075 | 3/2012 |

OTHER PUBLICATIONS

Jager, T et al., "Blickrichtungsabhangige Scharfentiefereduzierung fur stereoskopische Displays", Fkt Fernseh Und Kinotechnik, Fachverlag Schiele & Schon GMBH, Berlin, DE, vol. 63, No. 12, Dec. 1, 2009.
Mark Horton, Stereoscopic3D Post Using 3ality Digital 3flex SIP2100, Quantel White Paper, Nov. 1, 2008, pp. 1-14.
Sanjeev Koppal et al., "A Viewer-Centric Editor for 3D Movies", IEEE Computer Graphics and Applications, IEEE Service Center, New York, NY, vol. 31, No. 1, Jan. 1, 2011.
Zilly, F., et al. "Stan—an assistance system for 3d productions: from bad stereo to good stereo." Electronic Media Technology (CEMT), 2011 14th ITG Conference on. IEEE, 2011.
International Search Report for PCT/US2009/006690 dated Mar. 10, 2010 in 2 pages.
Japanese Office Action dated Mar. 8, 2016 in Japanese Application No. 2014-523219 in 8 pages.
English Translation of Japanese Office Action in JP Application No. 2014-520542 dated Jun. 21, 2016 in 6 pages.
Japanese Office Action dated Dec. 2, 2016 in Japanese Application No. 2014-523219 in 4 pages.
European Office Action dated Jul. 1, 2016 in EP Application No. 12720434.5 in 16 pages.
International Search Report dated Feb. 7, 2012 in PCT/EP2012/002038 in 3 pages.
Japanese Office Action and translation in Japanese application No. 2014-523219 dated Oct. 24, 2017 in 2 pages.

* cited by examiner

METHOD FOR SMOOTHING TRANSITIONS BETWEEN SCENES OF A STEREO FILM AND CONTROLLING OR REGULATING A PLURALITY OF 3D CAMERAS

INCORPORATION BY REFERENCE TO ANY PRIORITY APPLICATIONS

This application is a continuation of U.S. patent application Ser. No. 14/493,276, filed on Sep. 22, 2014, which is a continuation of U.S. patent application Ser. No. 14/233,729, filed on Jan. 17, 2014, which is the national phase under 35 U.S.C. § 371 of PCT Int'l Appl. No. PCT/EP2012/002038, filed May 11, 2012, which claims priority to German Patent Appl. 102011107765.4, filed Jul. 18, 2011. Any and all applications for which a foreign or domestic priority claim is identified in the Application Data Sheet as filed with the present application are hereby incorporated by reference under 37 CFR 1.57.

DETAILED DESCRIPTION

Figure 1:
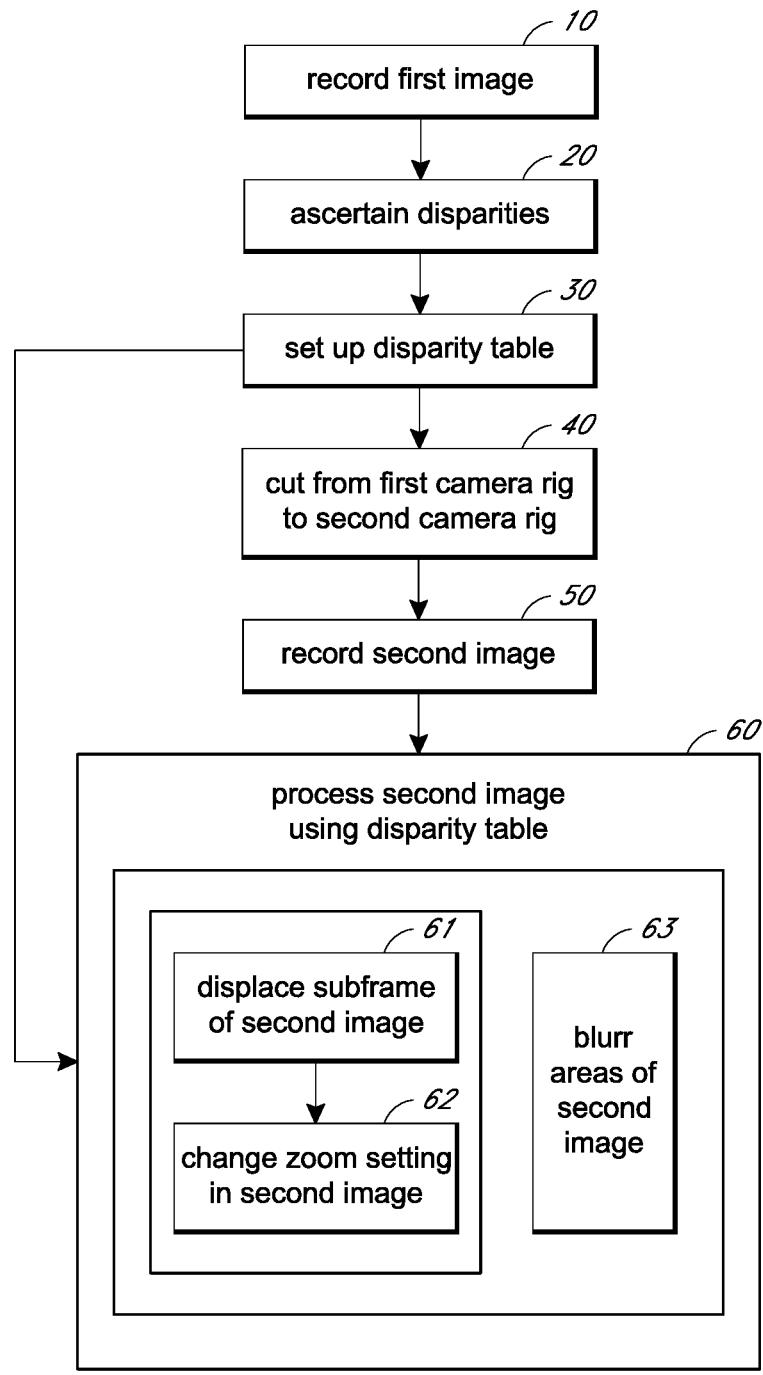
FIG. 1 shows a flowchart of a method for smoothing transitions between scenes of a stereo film and controlling or regulating a plurality of 3D cameras.

This application relates to a method for producing a stereo film, wherein a first image that is supplied by a first camera rig having at least two cameras is followed by a second image from a second camera rig, wherein furthermore a disparity table for the definition of the displacement of a defined image point in a first sub-frame supplied by a first camera of the first camera rig relative to an image point similar thereto in a second sub-frame supplied by a second camera of the first camera rig is determined in order to obtain information about the depth of the first image composed of the first sub-frame and the second sub-frame.

Camera rigs and methods for producing 3D films, or so-called stereo films, are known from prior art. Such films project a specific image for each eye of the viewer so that a three dimensional image is composed for the viewer.

Usually for the case of camera rigs used for the recording of scenes, two cameras are combined in each camera rig. While a first camera rig having two cameras is directed from a first viewing angle towards a scene to be filmed, a second camera having two further combined cameras is directed at a different viewing angle towards the scene. If now a "cut" is performed from the first camera rig to the second camera rig, i.e. if a sequence of images follows, which images are supplied by the first camera rig, said sequence being a sequence of images following the cut, which sequence is supplied by the other camera rig, then, in the case of three dimensional films, undesired effects often occur for the viewer due to the cut.

Thus it can happen that, when the first camera rig is directed towards a scene, a much larger impression of depth is achieved such that for example an object of the scene is perceived by the viewer to be far in front of a virtual plane of the screen, whereas upon cutting, the object is perceived as being far behind the plane of the screen, or at least not at the position observed from the other perspective a short while previously.

While no unpleasant effects occur in real life, if an object should suddenly come towards the viewer, this fast change in impression of depth during the reproduction of related information leads to discomfort for the viewer.

This is, inter alia, because in real life, for example in the case of observing a landscape, wherein an object, such as a ball spontaneously speeds towards a viewer, this ball is not in focus at first and thus the negative effects that occur when observing a film do not appear.

Therefore it is an object of some embodiments of the present invention to allow a cut to be made in a stereo film such that a first image that is supplied by a first camera rig having at least two cameras can be followed by a second image from a second camera rig, and the impression of depth created in both images does not cause unpleasant side effects for the viewer.

This object is solved according to some embodiments of the present invention in that the depth information of the disparity table of the first image of the first camera rig is used for the processing of the second image of the second camera rig.

A disparity table is understood to mean such a compilation of information that makes possible the assessment of the impression of depth of the first image. The impression of depth is created by means of an image depth analysis which can also be called lateral disparity or disparity. Such a disparity is an offset in the position which the same object in the picture occupies on two different image planes. The optical centers for the image planes of the lenses are in this way spatially separated from each other by the basis b. If both lenses have the focal length f, $$r = \frac{b \cdot f}{d}$$

applies for distance r, wherein d stands for the disparity. This formula applies only to the stereo normal case, i.e. when the two cameras are aligned in parallel. If both cameras are slightly pivoted towards one another, i.e., convergently aligned, a modified formula is applicable.

One can therefore determine the distance r to an object by a measuring of the disparities in the stereo image. A disparity map or a disparity table of a stereo image is therefore synonymous with a depth map.

It should be noted here that an image is understood to mean the compilation of two sub-frames, wherein each of the two sub-frames is supplied by one of the two cameras of a defined camera rig.

Some embodiments of the invention, which can be implemented in a Stereoscopic Image Processor (SIP), can analyze a scene and provide metadata concerning the depth or depth information of a near and distant object, and also supply information regarding the total space/total volume in real-time. In addition the SIP can also perform an image processing and image manipulation. In some embodiments of the proposed invention it is achieved that, based on the provided data, it is ensured that 3D-changes within a scene remain within the depth budget.

Advantageous embodiments are claimed in the dependent claims and are explained in more detail below.

Thus it is advantageous when a second sub-frame is displaced relative to a first sub-frame supplied from a first camera of the two cameras, wherein said first sub-frame forms the second image together with the second sub-frame supplied from a second camera of the second camera rig.

With a displacement of both sub-frames of the second camera rig relative to each other, the impression of depth is changed. Therefore the impression of depth can be adjusted to fit the impression of depth in the previously present first image.

When the second sub-frame is displaced horizontally, one can resort to a standard depth effect generation. If the second sub-frame, i.e. if for example a right sub-frame, is displaced from a left sub-frame towards the right, then the depth effect increases, whereas the depth effect is reduced for the reverse case. This is due to the lines of sight which run almost parallel to each other when observing a distant object, whereas in the case of a very near object, even an intersecting of the sightlines can occur. The disparities are arranged around a zero point, and can thus take negative as well as positive values.

It is further advantageous when the second sub-frame of the second camera rig is displaced in a displacement step by such a distance until the same disparity is present between the two sub-frames of the second image as between the two sub-frames of the first image. The viewer's eye in that case does not have to adjust and negative effects are almost completely removed.

The method can be further improved if the second image is magnified or reduced by means of a zoom setting with a correction step dependent on the disparity table of the first image, until the depth distance between a point in the foreground and a point in the background of the second image corresponds to the depth distance between these two points in the second image. By means of the change of the zoom setting, the perceived depth distance from a first object in the scene to a second object in the scene changes.

The disparities also diminish when the zoom setting operates only as a digital zoom and does not operate mechanically on the physical lenses of the second camera rig.

It is a further advantage here when the first and second sub-frame of the second image is magnified or reduced. With a reduction of the second image, the disparities also reduce linearly with the reduction of the image so that the negative side effects caused by disparities being too high when cutting do not appear to the user.

When the correction step is performed simultaneously with or following the displacing step, a positive result can be achieved particularly quickly in the first of the two cases, whereas a particularly exact result can be achieved in the second case.

It is further advantageous when the depth budget which is placed in the disparity table is applied to the second image such that all areas of the second image which lie beyond the depth budget are shown blurred. A depth budget is understood to mean the range caused by the disparities/the region caused by the disparities. Therefore when the smallest disparity is, for example, −50 and the largest disparity is 0, the image comprises a depth budget of −50 to 0.

In order to achieve a particularly efficient blurring, a Gaussian blurring algorithm is used to achieve the blurring in one or a plurality of regions of the second image. Therefore the areas are identified in which the depth budget of the second image is too large in comparison to the depth budget in the first image, and the identified areas are then displayed blurred. Under the Gaussian blurring algorithm, the surrounding pixels are used and the pixels which are to be displayed excessively blurred are recalculated according to a Gaussian normal distribution.

Some embodiments of invention also relate to a controlling or regulating of a plurality of 3D cameras, said 3D cameras being suited for the recording of a stereo film, wherein the controlling or regulating is configured such that it can perform the method according to the invention.

Some embodiments of the invention are also subsequently explained in more detail with the help of a picture. A first exemplary embodiment is visualized in a schematically depicted flowchart of a first figure (FIG. 1), wherein a second exemplary embodiment is visualized in a further figure (FIG. 2).

Figure 2:
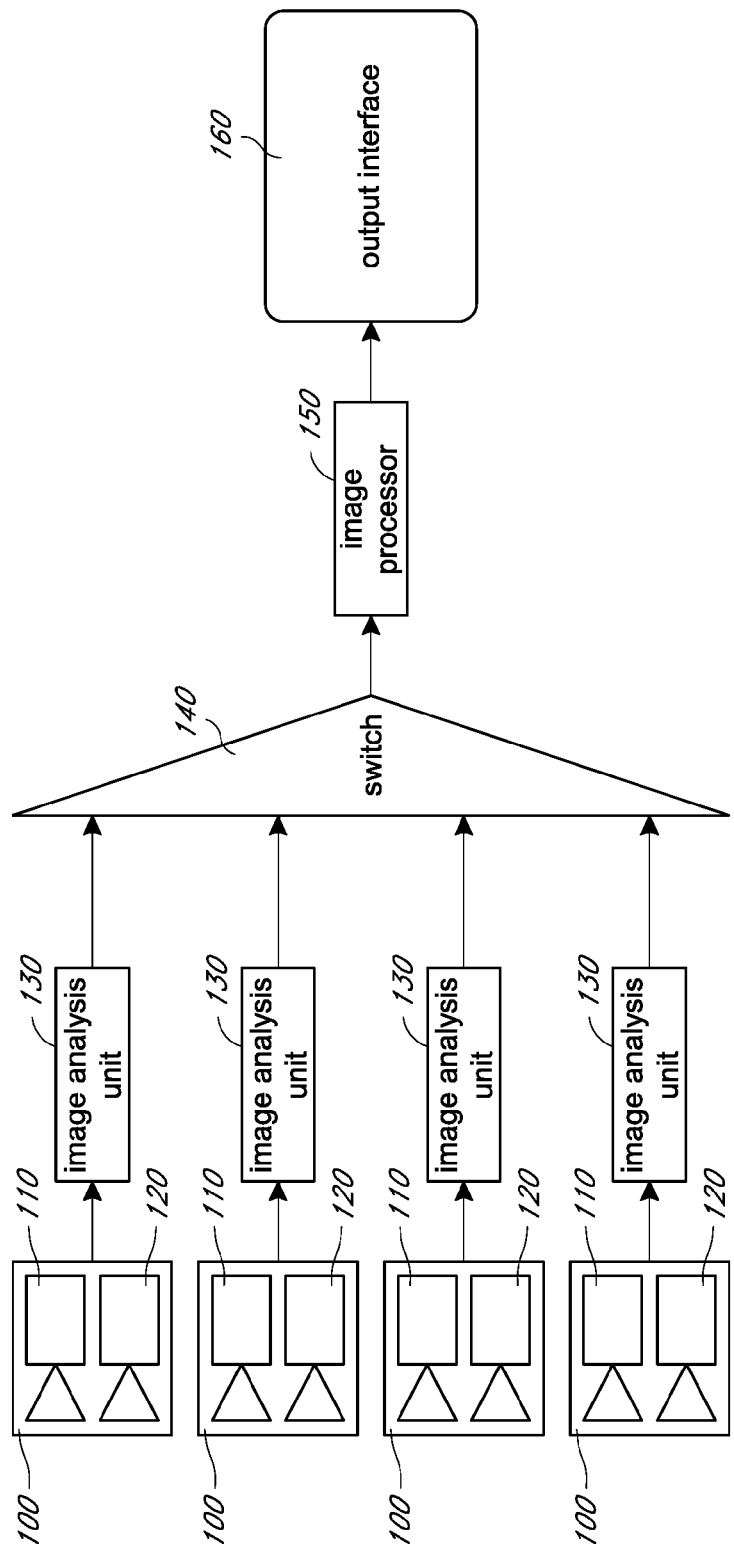
FIG. 2 shows a schematic view of a system for smoothing transitions between scenes of a stereo film and controlling or regulating a plurality of 3D cameras.

FIG. 1 shows a flowchart of a first exemplary embodiment of a method according to the invention:

In a first step 10, the recording of a first image takes place with a first camera rig comprising two cameras. In a subsequent second step 20, the disparities in the first image are ascertained.

In a subsequent third step 30, the setting up of a disparity table occurs, which can also be described as a disparity map.

In step 40, a cut takes place from the first camera rig to the second camera rig during the production of the film sequence of the stereo film. The second camera rig also contains two cameras.

In the subsequent step 50, the recording of a second image takes place with the second camera and its two cameras.

In the subsequent step 60, the use of the disparity table for the processing of the second image takes place.

In a sub-step 61, which is followed by a subsequent step 62 in the exemplary embodiment depicted here, the displacing of a sub-frame of the second image to another sub-frame of the second image takes place, wherein both of these two sub-frames form in total the second image. In the sub-step 62, a correction step is performed, in other words the zoom setting in the second image is changed. Thus in the displacing step 61, the disparity distribution in total is changed, whereas in the correction step 62 the present disparities per se are changed.

A blurring step 63 can also be performed in parallel to, subsequent to, or as an alternative to this. The blurring step comprises an identifying of areas of the second image which have too large or too small a disparity compared to the disparities of the first image. A blurring of these areas is realized, for example, by means of a Gaussian blurring algorithm.

A schematic construction of a second exemplary embodiment according to the invention is depicted in the second figure (FIG. 2):

Two cameras 110 and 120 are contained in each camera rig 100, which cameras send image data of a stereoscopic image pair to an image analysis unit 130. The image analysis unit 130 determines the scene depth in terms of near, middle and of a more remote area in real time.

These obtained metadata are either embedded in the image data of one or the other image of the stereoscopic image pair, or embedded in the image data of both images. These processed data are passed on to a switch 140, also identified as switcher.

The switch 140 allows a user to choose among the source data for an output interface 160, under the interposition of an image processor 150. The image processor 150 contains statistical depth budget parameters, in particular background data relating to a maximum allowable change per unit of time.

The image processor 150 manages a dynamic statistic from the depth information obtained from the metadata, calculates rates of change and change magnitudes and ensures that these values are within the depth budget to be used.

If the resulting depth change lies within the predetermined envelope, then the image pair is passed on unchanged to the output interface 160. If this is done repeatedly one after the other, the result is a video sequence.

If the depth change is not contained within the predefined depth budget, an image is adjusted, for example blurred, smudged, obscured, desaturated and/or masked/marked. The bigger the deviation from the depth budget, then the bigger the correcting operation of the blurring, for example. The operation can also include a blackflash or whiteflash, in other words a transition from black or white to some new image content. Instead of processing only a defined area, the entire image of the image pair can be blurred. This is particularly advantageous when no exact disparity map is available.

The method is repeated for each stereoscopic image pair.

What is claimed is:

1. A method for recording video, comprising:
   obtaining a first pair of images from a first pair of cameras;
   obtaining a second pair of images from a second pair of cameras;
   calculating a first displacement of at least one first image point contained in a first image of the first pair of images relative to at least one second image point contained in a second image of the first pair of images corresponding to the at least one first image point;
   storing the first displacement in a disparity table; and
   processing at least one image of the second pair of images using the disparity table.

2. The method of claim 1, further comprising displacing the second image of the first pair of images relative to the first image of the first pair of images.

3. The method of claim 2, wherein displacing the second image of the first pair of images relative to the first image of the first pair of images comprises horizontally displacing one of the first pair of images relative to the other of the first pair of images.

4. The method of claim 2, wherein the processing the at least one image of the second pair of images is performed simultaneously with displacing the second image of the first pair of images relative to the first image of the first pair of images.

5. The method of claim 2, wherein the processing the at least one image of the second pair of images is performed after displacing the second image of the first pair of images relative to the first image of the first pair of images.

6. The method of claim 1, further comprising displacing a second image of the second pair of images relative to a first image of the second pair of images to create a second displacement.

7. The method of claim 6, wherein the second displacement is substantially the same as the first displacement.

8. The method of claim 6, wherein displacing the second image of the second pair of images relative to the first image of the second pair of images comprises horizontally displacing one of the second pair of images relative to the other of the second pair of images.

9. The method of claim 6, wherein the processing the at least one image of the second pair of images is performed simultaneously with displacing the second image of the second pair of images relative to the first image of the second pair of images.

10. The method of claim 6, wherein the processing the at least one image of the second pair of images is performed after displacing the second image of the second pair of images relative to the first image of the second pair of images.

11. The method of claim 6, wherein the second displacement corresponds to a depth of the second pair of images.

12. The method of claim 1, further comprising changing a magnification of at least one of the first image of the second pair of images and the second image of the second pair of images in response to the disparity table.

13. The method of claim 12, wherein the magnification of at least one of the first image of the second pair of images and the second image of the second pair of images is changed digitally.

14. The method of claim 12, wherein the magnification of at least one of the first image of the second pair of images and the second image of the second pair of images comprises a magnification of both the first image of the second pair of images and the second image of the second pair of images.

15. The method of claim 12, wherein the magnification of at least one of the first image of the second pair of images and the second image of the second pair of images is changed until a second depth distance between a second foreground point in one image of the second pair of images and a second background point in the other image of the second pair of images is substantially the same as a first depth distance between a first foreground point in one image of the first pair of images and a first background point in the other image of the second pair of images.

16. The method of claim 1, further comprising blurring all areas of the second pair of images that lie outside a depth budget of the disparity table.

17. The method of claim 16, wherein the blurring is performed using a Gaussian blurring algorithm.

18. The method of claim 1, wherein the first displacement corresponds to a depth of the first pair of images.

19. A system configured to record video, the system comprising:
    an image processor configured to:
       receive a first pair of images from a first pair of cameras comprising at least a first image of the first pair of images and a second image of the first pair of images;
       receive a second pair of images from a second pair of cameras comprising at least a first image of the second pair of images and a second image of the second pair of images;
       calculate at least one first displacement between at least one first image point contained in the first image of the first pair of images and at least one corresponding second image point contained in the second image of the first pair of images;
       store the at least one first displacement in a disparity table; and
       process at least one of the first image of the second pair of images and the second image of the second pair of images using the disparity table.

20. The system of claim 19, wherein the image processor is further configured to displace the second image of the first pair of images relative to the first image of the first pair of images.

21. The system of claim 19, wherein the image processor is further configured to displace the second image of the second pair of images relative to the first image of the second pair of images to create at least one second displacement.

22. The system of claim 19, wherein the image processor is further configured to change a magnification of at least one of the first image of the second pair of images and the second image of the second pair of images in response to the disparity table.

23. The system of claim 22, wherein the image processor is further configured to change the magnification of at least one of the first image of the second pair of images and the second image of the second pair of images until a second depth distance between a second foreground point in one image of the second pair of images and a second background point in the other image of the second pair of images is substantially the same as a first depth distance between a first foreground point in one image of the first pair of images and a first background point in the other image of the second pair of images.

24. The system of claim 19, wherein the image processor is further configured to blur all areas of the second pair of images that lie outside a depth budget of the disparity table.

\* \* \* \* \*